April 30, 1935.  O. K. MARTI  1,999,772
MOTOR CONTROL SYSTEM
Filed Sept. 10, 1932
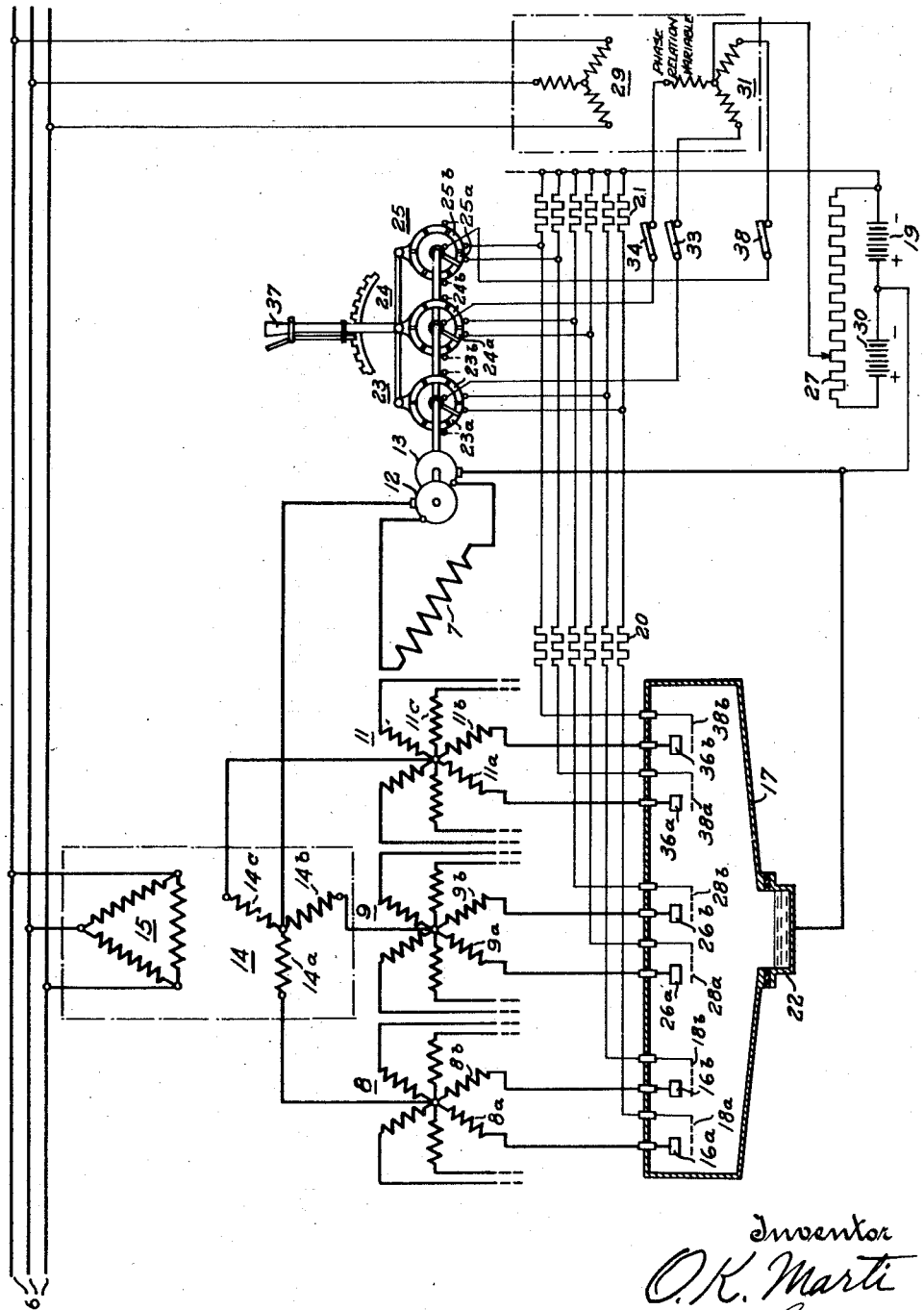

Patented Apr. 30, 1935

1,999,772

UNITED STATES PATENT OFFICE 1,999,772

MOTOR CONTROL SYSTEM

Othmar K. Marti, Wauwatosa, Wis., assignor to Allis-Chalmers Manufacturing Company, Milwaukee, Wis., a corporation of Delaware Application September 10, 1932, Serial No. 632,563

14 Claims. (Cl. 172—274)

This invention relates to improvements in the control of electric motors and more particularly to the control of polyphase alternating current motors in which the current in the armature windings is not conducted through the usual type of commutator.

Polyphase alternating current motors without commutators are known in the art, such motors generally comprising a rotating field excited with direct current and a fixed armature provided with suitable windings having their terminals directly connected with a polyphase alternating supply line or with the secondary windings of a transformer. Such motors generally operate at only one speed or, by use of different special means, operate at a limited number of operating speeds related to the frequency of the supply voltage wherefore such motors are known as synchronous motors. By controlling the armature currents of a motor of the above character through an electron discharge device, it is possible to operate such motor at a large number of operating speeds or even at continuously variable speeds. The motor may then be so connected as to operate with series, shunt or compound characteristics. Such results were heretofore only obtained by the use of commutator motors which present the well known disadvantages of high cost, commutation difficulties and voltage limitations. The use of an electron discharge device presents another advantage in that it also permits starting and reversing of the motor without the use of switching devices and without loss of energy.

It is, accordingly, among the objects of the present invention to provide a control system for alternating current polyphase motors without commutators to permit operation thereof at variable operating speeds.

Another object of the invention is to provide a control system for variable speed polyphase alternating current motors to permit operation thereof at high voltages.

Another object is to provide a control system for variable speed polyphase alternating current motors whereby such motors are brought up to operating speed without the use of switching devices.

Another object is to provide a control system for variable speed polyphase alternating current motors permitting reversal of the direction of the rotation thereof without the use of switching devices.

Another object is to provide a control system for variable speed polyphase alternating current motors in which the motor armature currents are controlled by means of an electron discharge device or of a plurality of such devices.

Objects and advantages other than those above set forth will be apparent from the following description when read in connection with the accompanying drawing, the single figure of which diagrammatically illustrates one embodiment of the present invention, in which the motor is so connected as to present series characteristics.

Referring more particularly to the drawing by characters of reference, reference numeral 6 designates a polyphase alternating current supply line represented as a three-phase line, this type of line being most frequently met in commercial practice. Supply line 6 supplies current to a motor having a field winding 7 and a plurality of armature windings 8, 9 and 11, all windings being of the construction usual in the art of so-called synchronous motors. It is assumed that winding 7 is rotating and is therefore energized through slip rings 12, 13. The field of the motor energized by winding 7 may be of the smooth core or of the salient pole type and may present any desired number of pairs of poles upon which portions of winding 7 are distributed as is well known in the art. Windings 8, 9 and 11 are assumed to be assembled in the stator of the motor and are each divided into a plurality of portions such as 8a, 8b, etc., connected to form a neutral point. Each of the several portions of windings 8, 9 and 11 may be arranged as turns enclosed in one slot or may be distributed among the slots of the armature to insure uniformity in the torque of the motor as is well known in the art. Windings receiving current simultaneously for a particular degree of rotation of the motor may be inserted in the same slots or may be inserted into separate slots of the armature. Each portion may also be divided into a plurality of windings constituting poles in equal number to the poles of field winding 7.

Each of armature winding portions such as 8a, 9a and 11a are severally connected with anodes such as 16a, 26a and 36a of an electron discharge device 17 of the arcing type operable as an electric current rectifier and provided with a cathode 22. The neutral points of windings 8, 9 and 11 are connected with the secondary windings 14a, 14b, 14c of a transformer having a primary winding 15 connected with line 6. Winding 14 is shown as being connected in star but such winding may be connected in zigzag or in other well known connection. The neutral point of winding 14 is connected with slip ring 12 and cathode 22 of rectifier 17 is connected with slip ring 13 thereby providing for series connection of the motor to give series characteristics thereto. Rectifier 17 is provided with groups of control electrodes 18, 28 and 38 which are energized at a negative potential relative to the potential of cathode 22 from a battery 19 through current limiting resistances 20 and 21. The control electrodes may also be energized at a positive or negative potential from a potentiometer 27 connected across battery 19 and a second battery 30, and simultaneously receive alternating potentials from secondary winding 31 of a transformer having a primary winding 29 connected with line 6. Such energization is controlled by means of distributors 23, 24, 25 having their brushes mounted on the shaft of the motor and their segments spatially adjustable by means of a lever 37.

In operation, assuming the system to be connected as shown and momentarily in the position indicated on the drawing, line 6 energizes winding 15 which induces alternating potentials in the several portions of winding 14. All the control electrodes of rectifier 17, with the exception of control electrodes 18a, 28a and 38a, receive a negative potential from battery 19 and, therefore, prevent the flow of current through the anodes associated therewith. Control electrodes 18a, 28a and 38a receive a direct current potential from potentiometer 27 and receive three-phase alternating current potentials from winding 31. Transformer 29, 31, which may be constructed as a phase shifter, is so adjusted that control electrodes 18a, 28a and 38a sequentially become positive with respect to cathode 22 when associated anodes 16a, 26a and 36a respectively are energized at positive potentials from windings 14a, 14b and 14c respectively connected therewith. Anodes 16a, 26a and 36a thus sequentially carry current during each cycle of the supply line voltage, such currents flowing through windings 8a, 9a and 11a and combining to form direct current flowing from cathode 22 through slip ring 17, winding 7 and slip ring 12 to the neutral point of winding 14. The flow of current through windings 7, 8a, 9a and 11a during one or more cycles of the supply line voltage produces a torque which causes rotation of field 7. Such rotation also causes the brushes of the distributors to leave segments 23a, 24a and 25a and to come into contact with segments 23b, 24b and 25b thereof. Control electrodes 18a, 28a and 38a thus are negatively energized from battery 19 thereby preventing the associated anodes 16a, 26a and 36a from again carrying current during subsequent cycles of the supply line voltage. Control electrodes 18b, 28b and 38b then receive direct current potential from potentiometer 27 and also receive alternating current potentials from winding 31 thereby permitting operation of the associated anodes 16b, 26b and 36b in a manner similar to that previously described for anodes 16a, 26a and 36a. Currents thus flow through windings 7, 8b, 9b and 11b, thereby producing a torque on the motor and causing further rotation of field 7.

The above process is repeated sequentially for each portion of windings 8, 9 and 11 during each revolution of the field of the motor. Depending on the speed of the motor, each particular portion of the armature windings will receive current during a variable number of cycles of the supply line voltage. Any of the means known in the art for the control of rectifiers may be used to regulate the amount of current supplied to the motor from line 6. The potential impressed on the control electrodes thereof from potentiometer 27 may be adjusted thereby varying the point of the alternating current voltage cycle at which the anodes begin to carry current and thereby regulating the amount of current carried by such anodes as is well known in the art. Such result may also be obtained by adjustment of phase shifter 29, 31. Such adjustment of the armature current gives a corresponding adjustment in the range of torques and of speeds at which the motor operates. Another means for controlling the characteristics of the motor resides in shifting the position of distributors 23, 24 and 25 with respect to the position of the armature windings by means of lever 37. The particular armature winding portions receiving current may thus be selected with respect to the position of the field winding, thereby varying the torque caused by the interaction of the currents in such windings.

When the motor is at rest, flow of current therethrough is prevented by opening switches 33, 34, and 38 to permit energization only of the control electrodes of rectifier 17 at the negative potential of battery 19. During starting of the motor, the current therethrough may be maintained within any desired range of values by adjustment of potentiometer 27 or of phase shifter 29, 31. The current may be reduced further by closing only one or two of switches 33, 34, 38 thereby permitting positive energization of only one of the groups of control electrodes such as electrodes 38, thereby permitting flow of current only through the several portions of winding 11. Assuming that, in the position shown for distributors 23, 24 and 25, flow of current through the windings of the motor produces the maximum torque and a gradual shift of the distributor segments by means of lever 37 will cause such torque to decrease in value and to reach the zero value when such distributors are moved by an angle of 90 electrical degrees. Further shifting of the distributors will cause the currents in the motor to produce a torque opposite to the torque produced previously, thereby permitting reversal of the direction of rotation of the motor without the use of switching devices and without loss of energy. It will be understood that switches may be provided for disconnecting the motor from the supply line but such switches will be used for opening the circuit without interruption of current except upon occurrence of short circuits or other disturbance in the system.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a control system for a motor having a plurality of stator windings and a rotor winding, a polyphase supply line, a transformer connected with said line, the several phases of the secondary winding of said transformer forming a neutral point and being severally connected with the stator windings, an electron discharge device having anodes and a cathode, the anodes being connected with the stator windings and the cathode being connected with one terminal of the rotor winding, the other terminal of the rotor winding being connected with the neutral point of said transformer, and means for controlling the operation of said device to control the motor.

2. In a control system for a motor having a plurality of stator windings and a rotor winding, a polyphase supply line, means connecting the stator windings with said line, an electron discharge device having anodes with associated control electrodes and a cathode, the anodes being connected with the stator windings and the cathode being connected with the rotor winding, a transformer connected with said line, a source of direct current connected with the cathode and with said transformer, and a plurality of distributors connecting the control electrodes with said transformer to control the operation of said device.

3. In a control system for a motor having a plurality of stator windings and a rotor winding, a polyphase supply line, means connecting the stator windings with said line, an electron discharge device having anodes with associated control electrodes and a cathode, the anodes being connected with the stator windings and the cathode being connected with the rotor winding, a transformer connected with said line, a source of direct current connected with the cathode and with said transformer, a plurality of distributors connecting the control electrodes with said transformer to control the operation of said device, and means for varying the position of said distributors relative to the positions of the stator windings.

4. In a control system for a motor having a plurality of stator windings and a rotor winding, a polyphase supply line, means connecting the stator windings with said line, an electron discharge device having anodes with associated control electrodes and a cathode, the anodes being connected with the stator windings and the cathode being connected with the rotor winding, a source of direct current, means connecting said source with the cathode to obtain a variable potential from said source relative to the potential of the cathode, a transformer connected with said line and with the second said means, and a plurality of distributors sequentially connecting the control electrodes and said transformer to control the operation of said device.

5. In a control system for a motor having a plurality of stator windings and a rotor winding, a polyphase supply line, means connecting the stator windings with said line, an electron discharge device having anodes with associated control electrodes and a cathode, the anodes being connected with the stator windings and the cathode being connected with the rotor winding, a source of direct current, means connecting said source with the cathode to obtain a variable potential from said source relative to the potential of the cathode, a phase shifting transformer connected with said line and with the second said means, a plurality of distributors connected with the control electrodes, switches severally connecting the secondary windings of said transformer with said distributors, said distributors being operated by the motor for sequentially impressing a potential positive to that of the cathode on the control electrodes, and means for shifting the positions of said distributors relative to the position of the stator windings.

6. In a control system for an electric motor having a field excitation winding and a plurality of armature windings each comprising a plurality of angularly displaced sections connected to form a neutral point, a source of polyphase alternating current connected with said field winding and having the phases thereof severally connected with said neutral points, electron discharge means having a cathode connected with said field winding and a plurality of anodes severally connected with said winding sections, a plurality of control electrodes severally associated with said anodes, and means having connections with said control electrodes operable to impress potential thereon of such sign and magnitude and during such recurring periods as to control the initiation of flow of current from said source of current sequentially through the respective sections of said armature windings by way of said anodes and cathode.

7. In a control system for an electric motor having a field excitation winding and a plurality of armature windings each comprising a plurality of angularly displaced sections connected to form a neutral point, a source of polyphase alternating current connected with said field winding and having the phases thereof severally connected with said neutral points, electron discharge means comprising a cathode connected with said field winding, a plurality of anodes severally connected with the sections of said armature windings, and a plurality of control electrodes severally associated with said anodes, a source of current having connections with said cathode and with said control electrodes for continuously impressing on the latter potential of such sign and magnitude as to prevent flow of current through the sections of said armature windings by way of said anodes, and means having connection with said source of alternating current and with said control electrodes operable to impress potential on the latter of such sign and magnitude and at such recurring periods as to permit flow of current from said source of alternating current sequentially through the respective sections of said armature windings by way of said anodes and cathode.

8. In a control system for an electric motor having a field excitation winding and a plurality of armature windings each comprising a plurality of angularly displaced sections connected to form a neutral point, a source of polyphase alternating current connected with said field winding and having the phases thereof severally connected with said neutral points, electron discharge means having a cathode connected with said field winding and a plurality of anodes severally connected with said winding sections, a plurality of control electrodes severally associated with said anodes, and means having connections with said control electrodes operable to periodically apply potential thereto of such sign and magnitude and during such recurring periods as to control the moments of initiation of flow of current from said source sequentially through the respective sections of said armature windings by way of said anodes and cathode, the said means including distributor switch means for varying the moments of application of said potential to said control electrodes.

9. In a control system for an electric motor having a field excitation winding and a plurality of armature windings each comprising a plurality of angularly displaced sections connected to form a neutral point, a source of polyphase alternating current connected with said field winding and having the phases thereof severally connected with said neutral points, electron discharge means having a cathode connected with said field winding and a plurality of anodes severally connected with said winding sections, a plurality of control electrodes severally associated with said anodes, means comprising a transformer having connections with said source of current and with said control electrodes operable to periodically apply potential thereto of such sign and magnitude and during such recurring periods as to control the moments of initiation of flow of current from said source sequentially through the respective sections of said armature windings by way of said anodes and cathode, and distributor switch means included in the connections of said transformer with said control electrodes for varying the moments of application of said potential to the said control electrodes.

10. In a control system for an electric motor having a field excitation winding and a plurality of armature windings each comprising a plurality of angularly displaced sections connected to form a neutral point, a source of polyphase alternating current, a transformer having connections with said source of current and comprising a polyphase winding connected to form a neutral point connection with said field winding and having the phase sections thereof severally connected with the neutral point of the respective said armature windings, electron discharge means comprising a cathode connected with said field winding, a plurality of anodes severally connected with the sections of said armature windings, and a plurality of control electrodes severally associated with said anodes, means comprising a transformer having connections with said source of current and with said control electrodes operable to periodically apply potential thereto of such sign and magnitude and during such recurring periods as to control the moments of initiation of flow of current sequentially through the respective sections of said armature windings by way of said anodes and cathode, and distributor switch means included in the connections of the last said transformer with said control electrodes and operated by said motor for varying the moments of application of said potential to the said control electrodes.

11. In combination with a polyphase alternating current circuit, and an electric motor comprising a plurality of armature windings severally connected with the phases of said circuit to be supplied with operating current therefrom, of an electron discharge device comprising a plurality of anodes severally included in the operative connections of said windings with the phases of said circuit and control electrodes severally associated with said anodes, a transformer connected with said circuit, a source of direct current connected with said transformer, and means comprising an element operated by said motor for sequentially connecting the said control electrodes with said transformer at such recurring moments as to thereby control the moments of initiation of flow of said operating current sequentially through said windings.

12. The combination with a polyphase alternating current circuit, and an electric motor comprising a plurality of armature windings severally connected with the phases of said circuit to be supplied with operating current therefrom, of an electron discharge device comprising a plurality of anodes severally included in the operative connections of said windings with the phases of said circuit and control electrodes severally associated with said anodes, a transformer connected with said circuit, a source of direct current connected with said transformer, means comprising an element operated by said motor for sequentially connecting the said control electrodes with said transformer at such recurring moments as to thereby control the moments of initiation of flow of said operating current sequentially through said windings, and means for adjusting the first said means in such sense as to vary the moments of said connections of said control electrodes with said transformer, to thereby control the speed of rotation of said motor.

13. The combination with a polyphase alternating current circuit, and an electric motor comprising a plurality of armature windings severally connected with the phases of said circuit to be supplied with operating current therefrom, of an electron discharge device comprising a plurality of anodes severally included in the operative connections of said windings with the phases of said circuit and control electrodes severally associated with said anodes, means for exciting said control electrodes comprising a transformer energized from said circuit to control the flow of said operating current, means comprising an element operated by said motor for sequentially connecting the first said means with said control electrodes at such recurring moments as to thereby control the moments of initiation of said flow of current sequentially through said windings, and means for adjusting the second said means in such sense as to vary the moments of said connections of the first said means with said control electrodes relative to the voltage frequency of said circuit, to thereby regulate the speed of rotation of said motor.

14. The combination with a polyphase alternating current circuit, and an electric motor comprising a plurality of armature windings severally connected with the phases of said circuit to be supplied with operating current therefrom, of an electron discharge device comprising a plurality of anodes severally included in said operative connections of said windings with said circuit and control electrodes severally associated with said anodes, means for exciting said control electrodes comprising a transformer energized from said circuit to control the flow of said operating current, distributor switch means operated by said motor for sequentially connecting the first said means with said control electrodes at such recurring moments as to thereby control the moments of initiation of said flow of current sequentially through said windings, and means for adjusting the second said means in such sense as to vary the moments of said connections of the first said means with said control electrodes relative to the voltage frequency of said circuit, to thereby regulate the speed of rotation of said motor.

OTHMAR K. MARTI.